US009812848B2

(12) United States Patent
Bellows et al.

(10) Patent No.: US 9,812,848 B2
(45) Date of Patent: Nov. 7, 2017

(54) FIXED VERTICAL DISTRIBUTION BUS BAR

(71) Applicant: Rockwell Automation Technologies, Inc., Mayfield, OH (US)

(72) Inventors: Troy M. Bellows, Racine, WI (US); Krzysztof J. Blok, Cracow (PL); Radoslaw Zacharzewski, Katowice (PL); Artur J. Wiertek, Bedzin (PL); Grzegorz A. Naczynski, Zabrze (PL); Pawel Kokula, Dabrowa Gornicza (PL); Tomasz Lorek, Radzionkow (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 125 days.

(21) Appl. No.: 14/982,205

(22) Filed: Dec. 29, 2015

(65) Prior Publication Data
US 2017/0125982 A1    May 4, 2017

Related U.S. Application Data

(60) Provisional application No. 62/248,942, filed on Oct. 30, 2015.

(51) Int. Cl.
    *H02B 1/20*    (2006.01)
    *H01B 17/18*   (2006.01)
(52) U.S. Cl.
    CPC .............. *H02B 1/20* (2013.01); *H01B 17/18* (2013.01)
(58) Field of Classification Search
    None
    See application file for complete search history.

(56) References Cited

U.S. PATENT DOCUMENTS

| | | | | |
|---|---|---|---|---|
| 3,219,887 A | * | 11/1965 | Gerg | H02B 1/21 174/99 B |
| 3,710,198 A | | 1/1973 | Burton | |
| 4,307,304 A | * | 12/1981 | Kovatch | H02B 1/21 174/71 B |

(Continued)

FOREIGN PATENT DOCUMENTS

EP    2264847 A2    12/2010

OTHER PUBLICATIONS

European Search Report ; Application No. 16195940.8; dated Feb. 28, 2017.

*Primary Examiner* — Courtney Smith
(74) *Attorney, Agent, or Firm* — Boyle Fredrickson, SC

(57) ABSTRACT

The detrimental effects of environmental hazards on units having withdrawable stabs or contacts may be overcome by using fixed feed units in compartments in a manner akin to withdrawable units. In particular, multiple fixed feed units may be provided in a single section or column by implementing vertical bus bars providing multiple connection points particular to fixed feed units. As a result, fixed feed units may be mounted to the vertical bus bars, as opposed to horizontal main bus bars or requiring complex wiring, thereby allowing multiple fixed feed units to be efficiently provided to maximize space. An electrically insulating bus support, which may be supplemented with bracing, may provide improved short-circuit protection. Electrically insulating covers over fixed feed unit connections may also provide electrical isolation in the system in accordance with industry standards. Moreover, in one aspect, fixed feed units and withdrawable units may be intermixed.

16 Claims, 15 Drawing Sheets

(56) References Cited

U.S. PATENT DOCUMENTS

| | | | |
|---|---|---|---|
| 4,316,234 A | | 2/1982 | Takagi et al. |
| 5,905,631 A | * | 5/1999 | Winkler .................. H02B 1/36 |
| | | | 211/162 |
| 6,270,361 B1 | * | 8/2001 | Onizuka ................ H01R 9/226 |
| | | | 439/76.2 |
| 6,781,818 B2 | * | 8/2004 | Josten ..................... H02B 1/21 |
| | | | 174/149 B |
| 6,870,103 B1 | * | 3/2005 | Wiant .................... H02G 5/007 |
| | | | 174/68.2 |
| 8,379,374 B2 | * | 2/2013 | Keegan ................ H01R 25/142 |
| | | | 174/68.2 |
| 8,420,935 B2 | * | 4/2013 | Malkowski, Jr. ........ H02B 1/21 |
| | | | 174/68.2 |
| 8,730,651 B2 | * | 5/2014 | Rusch ..................... H02B 1/21 |
| | | | 361/627 |
| 2007/0109733 A1 | * | 5/2007 | Malkowski ............. H02B 1/21 |
| | | | 361/648 |

* cited by examiner

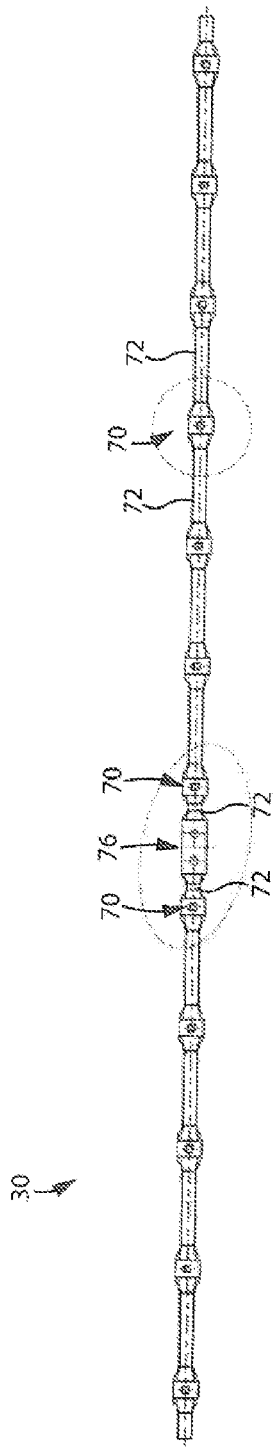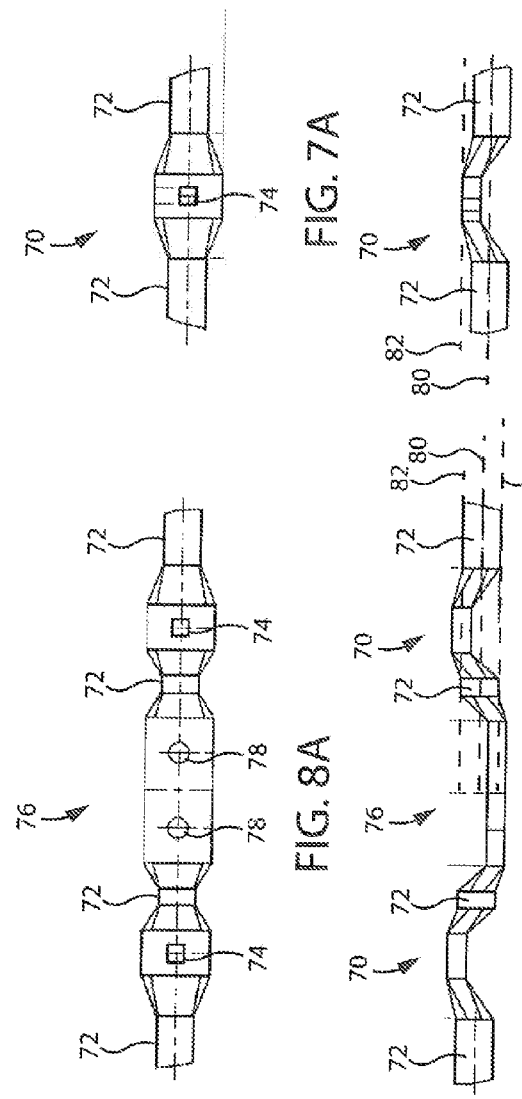

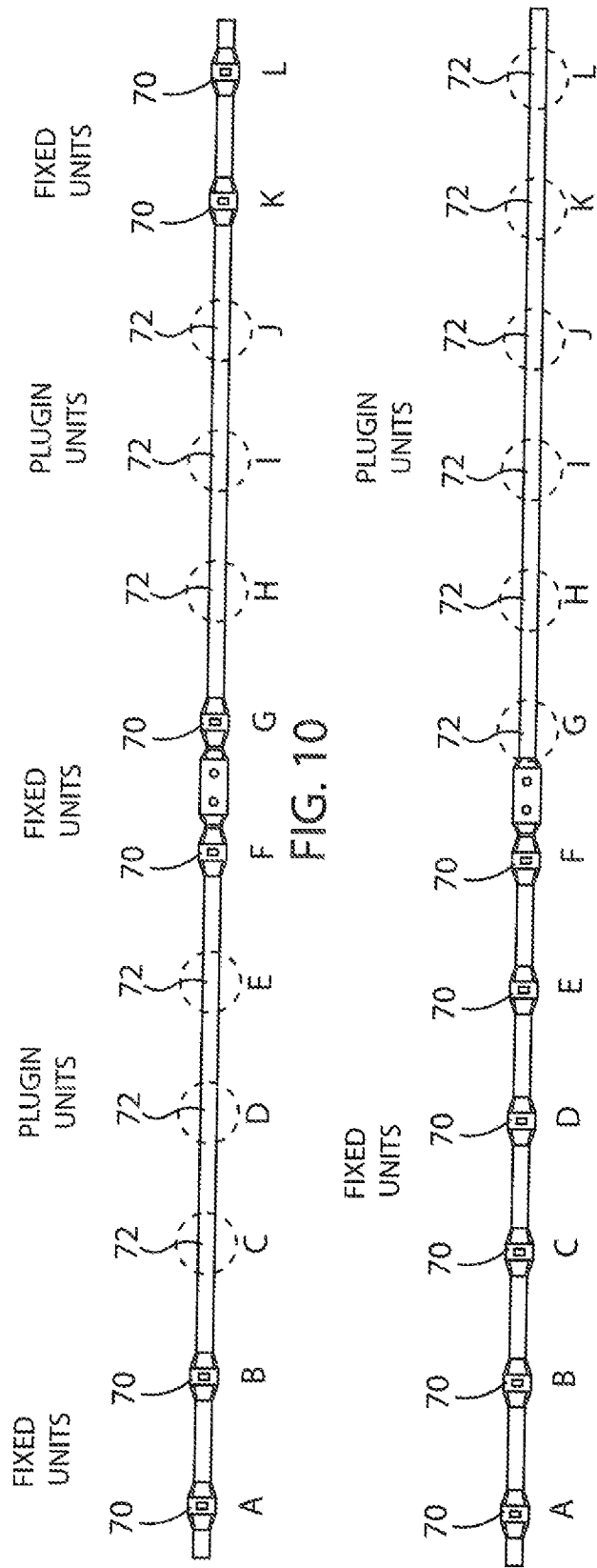

FIXED VERTICAL DISTRIBUTION BUS BAR

CROSS-REFERENCE TO RELATED APPLICATIONS

This application claims priority to U.S. Provisional Patent Application No. 62/248,942, entitled "Fixed Vertical Distribution Bus Bar," filed on Oct. 30, 2015, which is herein incorporated by reference.

FIELD OF THE INVENTION

The present invention relates generally to motor control centers, and more particularly, to electrical power distribution in such systems.

BACKGROUND

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and so forth, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that may feed three-phase AC power to horizontal bus bars of the MCC. The horizontal bus bars, in turn, may feed the three-phase power to vertical bus bars disposed in each of the sections or columns of the MCC. The vertical bus bars, in turn, may feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

Units are typically plug-in or "withdrawable" in that they often use a set of stabs or contacts to connect to or disconnect from the MCC for mechanical and electrical engagement/disengagement. Such withdrawable units may be readily supplied by vertical distribution bus bars, and are convenient in that they may be more easily moved around or replaced than non-withdrawable units which are often screwed or wired to horizontal main bus bars of the MCC (also referred to as "fixed feed" or "frame mounted" units).

However, in some industries, such as mining, conductive or abrasive dust in the environment may make withdrawable units undesirable due to fretting corrosion and/or debris. Such hazards may cause contact intermittency and/or increased contact resistance for withdrawable stab contacts, which could thereby lead to a system failure.

SUMMARY OF THE INVENTION

The present inventors have recognized that the detrimental effects of environmental hazards on units having withdrawable stabs or contacts may be overcome by using fixed feed units in compartments in a manner akin to withdrawable units. In particular, multiple fixed feed units may be provided in a single section or column by implementing vertical bus bars providing multiple connection points particular to fixed feed units. As a result, fixed feed units may be mounted to the vertical bus bars, as opposed to horizontal main bus bars or requiring complex wiring, thereby allowing multiple fixed feed units to be efficiently provided to maximize space. An electrically insulating bus support, which may be supplemented with bracing, may provide improved short-circuit protection. Electrically insulating covers over fixed feed unit connections may also provide electrical isolation in the system in accordance with industry standards. Moreover, in one aspect, fixed feed units and withdrawable units may be intermixed.

Aspects of the invention may allow for a fixed module solution to maximize space inside a section or column of an electrical system, such as an MCC, by allowing multiple control modules to be placed in one column. Accordingly, fixed modules may be supplied by conductors fed by vertical distribution bus bars, rather than the horizontal main bus bars, in order to maximize space and/or reduce costs. Also, continuously supporting the vertical distribution bus bars may further ensure withstanding short circuit hazards and may provide improved internal arcing fault mitigation and performance, given a continuous separation of conductors from one another.

Accordingly, in one aspect, the invention may provide a mechanism for connecting fixed motor control center modules by specially forming continuously supported round copper bus bars. Wires may be connected to vertical distribution bus bars using straight or bent crimp lugs and fasteners such as square shank carriage T-bolts. Connection points, and vertical bus bars, may be covered with continuous (electrically insulating) plastic covers, which may provide separation between the vertical bus and the functional unit space in accordance with International Electrotechnical Commission (IEC) 60529 IP2X (International Protection Rating for fingers or similar objects), IP4X and/or similar standards. Accordingly, a compact fixed module design may be provided.

One or more advantages of the invention may include: providing a substantially curved or round vertical bus bar, such as a solid or hollow seamless copper tubing provided based on electrical current ratings of the system; continuously supporting the bus bar, such as by a molded bus support which may be, for example, plastic or a glass filled thermoset, and which may support and isolate the vertical bus bars from a horizontal main bus bar compartment; transitioning the bus bar from a round cross-section to a flat cross-section in multiple locations (such as twelve), thereby providing a flat point of contact to land feed conductors for functional units in the MCC; flat contact points containing square through holes to accept square neck carriage bolts or T-bolts in order to solidly bolt crimp lugs directly to the bus bar, thereby providing a solid, reliable electrical connection with minimal maintenance required; providing a continuous bus support molding covered by a polycarbonate (electrically insulating) cover providing openings at each contact point location, along with accessory one or more covers proving IP2X and/or IP4X separation between a vertical distribution bus bar compartment and a functional unit compartment; and/or providing fully encapsulated vertical distribution bus bars to form are ignition protected zones per IEC TR 61641, thereby providing improved internal arcing fault prevention (due to spacing and configuration of the bus bars) and/or personnel protection.

Specifically then, one aspect of the present invention provides a bus system including: multiple vertical bus conductors, each vertical bus conductor having multiple substantially flat areas between substantially curved areas, the substantially flat areas each having an aperture configured to receive a fastener, and an electrically insulating bus support having multiple vertical channels configured to receive the vertical bus conductors.

Another aspect may provide an electrical system including: multiple compartments, each compartment being configured to receive a unit having an electrical component; multiple vertical bus conductors, each vertical bus conductor having a multiple substantially flat areas between substantially curved areas, the substantially flat areas each having an aperture providing a fastener exposed in a compartment; multiple horizontal bus conductors; and an electrically insulating bus support having multiple vertical channels configured to receive the vertical bus conductors. The electrically insulating bus support electrically isolates the vertical bus conductors from the horizontal bus conductors. Each horizontal bus conductor is attached to a different vertical bus conductor.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a plan view of an exemplar vertical bus conductor in accordance with an embodiment of the invention;

FIG. 7A is a detailed plan view of a substantially flat area of the vertical bus conductor of FIG. 6, and FIG. 7B is an isometric view of the substantially flat area of FIG. 7A, in accordance with an embodiment of the invention;

FIG. 8A is a detailed plan view of substantially flat areas in one plane and an additional, larger substantially flat area (which may connect to a horizontal bus conductor) in another plane of the vertical bus conductor of FIG. 6, and FIG. 8B is an isometric view of the substantially flat areas in one plane and the additional substantially flat area in another plane of FIG. 8A, in accordance with an embodiment of the invention;

FIG. 10 is an isometric view of an exemplar vertical bus conductor having substantially flat areas and substantially curved areas according to a first arrangement in accordance with an embodiment of the invention;

FIG. 11 is an isometric view of an exemplar vertical bus conductor having substantially flat areas and substantially curved areas according to a second arrangement in accordance with an embodiment of the invention;

DETAILED DESCRIPTION

Figure 1:
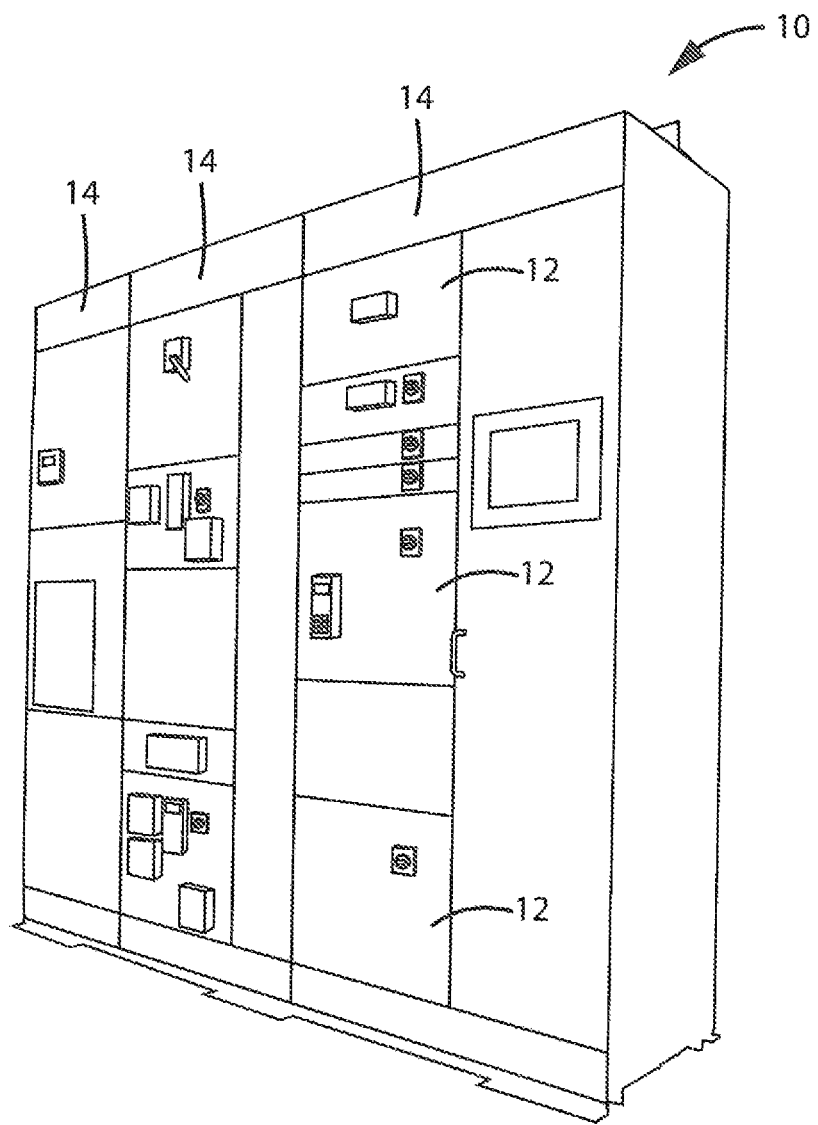
FIG. 1 is an isometric view of an exemplar electrical system in which electrical units of various types may be housed in accordance with an embodiment of the invention.
Figure 2:
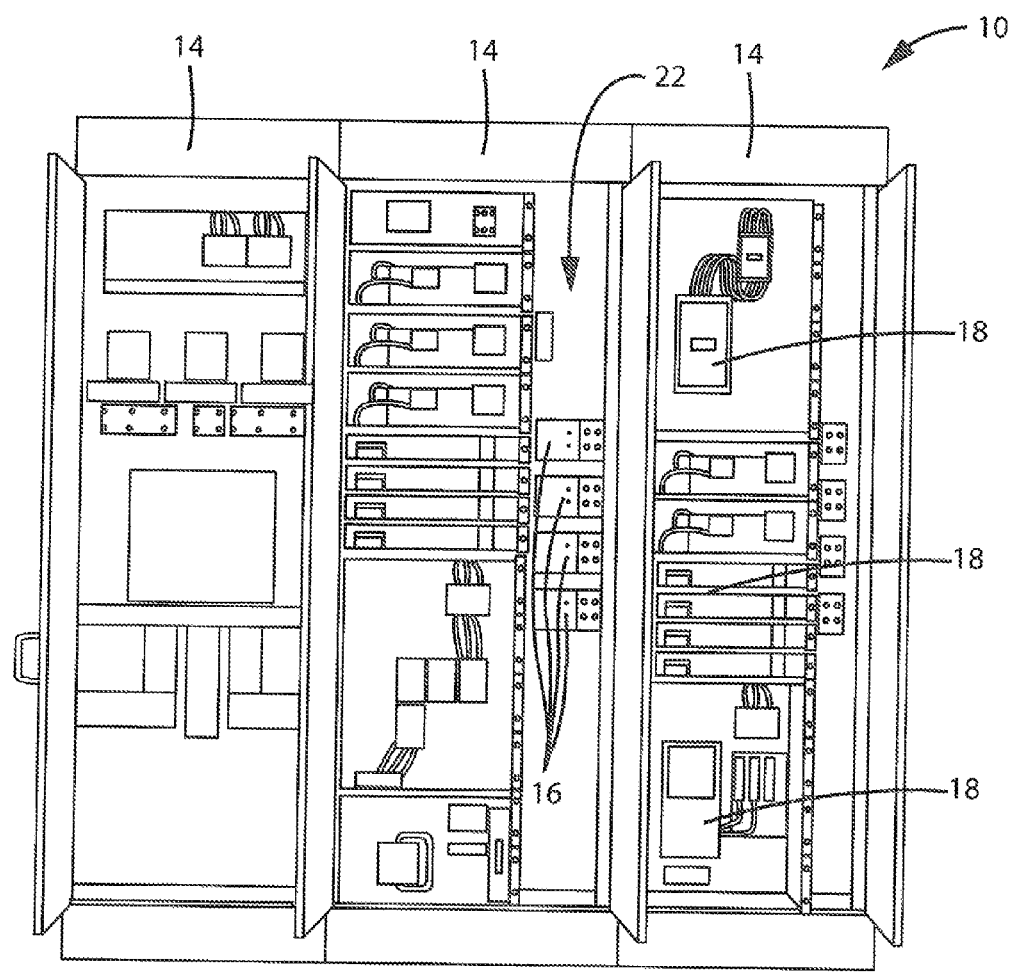
FIG. 2 is an interior view of the electrical system of FIG. 1.

Referring now to FIGS. 1 and 2, an exemplar electrical system 10 is provided in which electrical units 12 of various types may be housed. The electrical system 10 may be, for example, a Motor Control Center ("MCC") or other industrial, commercial, marine, or other electrical system. In general, the electrical system 10 may provide one or more sections 14, each forming a shell around a device mounting volume (compartment) for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed ("fixed feed" or "frame mounted") or plug-in ("withdrawable") engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever (such as a rotary lever to turn ON and OFF a Circuit Breaker inside the unit and enabling opening of the door when the Circuit Breaker is OFF), a lock for preventing the door from opening, and/or light for indicating a safe condition for opening the door. A latch rail (not shown) may be provided in each section 14 to interface with latches on the individual doors of the units 12.

The sections 14 may also include wire-ways 20 and 22 in which line and load wiring, cabling and so forth may be installed to service the components 18. The sections 14 may optionally include preconfigured isolation areas between sections 14 for variations in which greater electrical isolation between sections 14 is desired, such as in compliance with IEC 61439-2 Forms 3, 3a, 4 or 4b.

Figure 3:
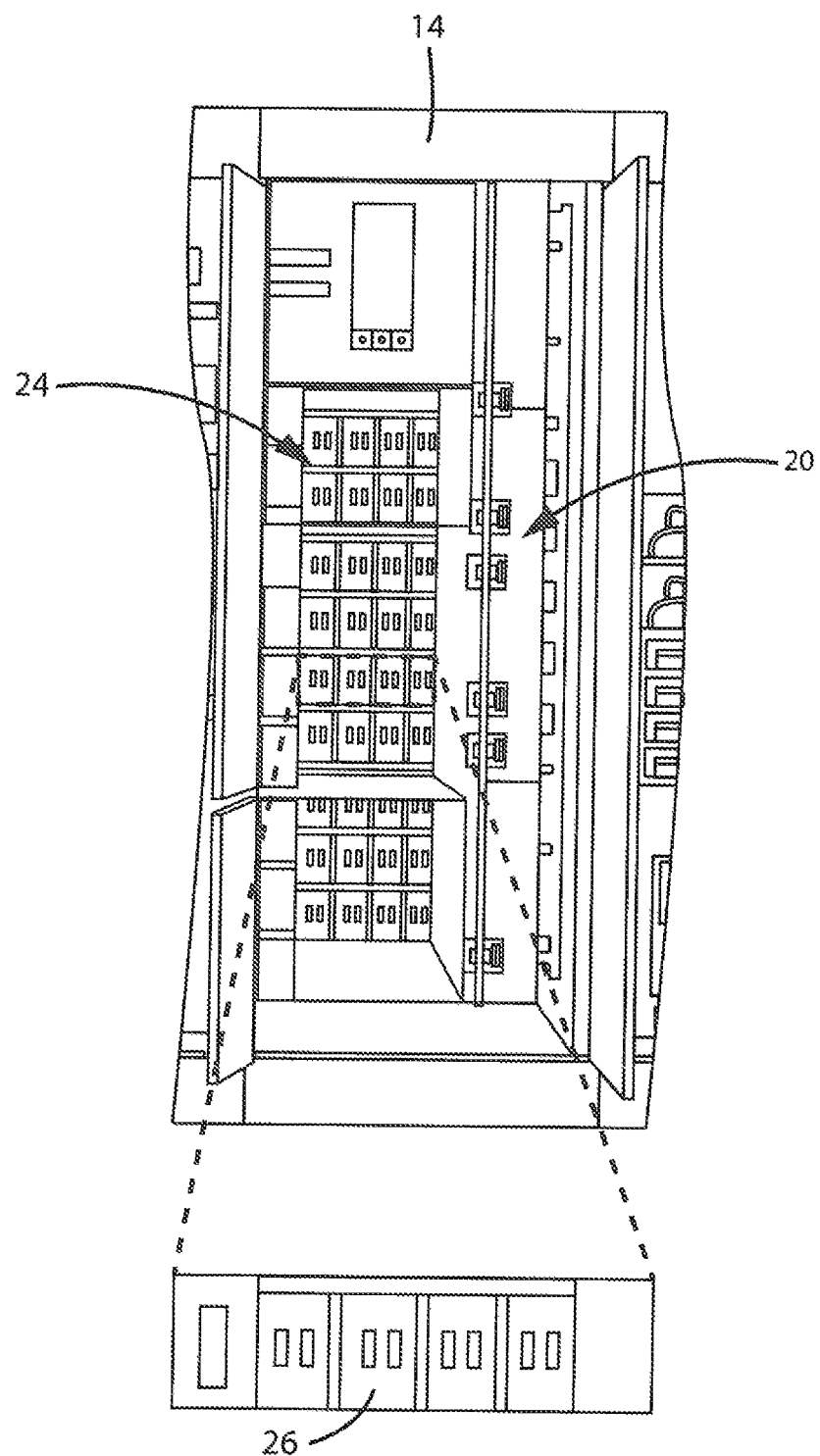
FIG. 3 is an interior view of a section of the electrical system of FIG. 1.

Referring also to FIG. 3, along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 4:
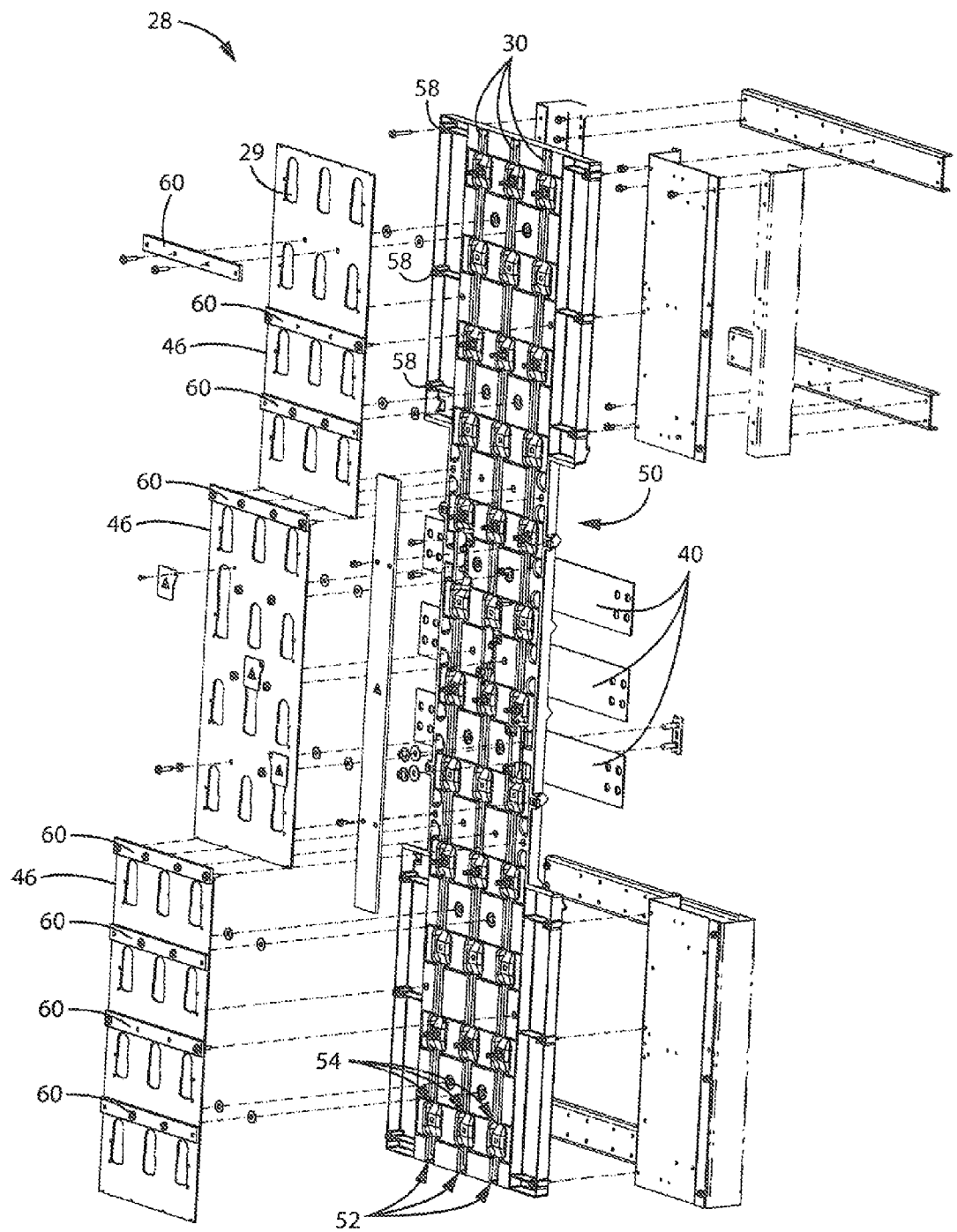
FIG. 4 is an exemplary exploded view of a 3-pole bus system with an electrically insulating bus support which may be used in the electrical system of FIGS. 1-3.

Referring now to FIG. 4, an exemplary exploded view of a 3-pole bus system 28 which may be used in the electrical system 10 of FIGS. 1-3 is provided. The bus system 28 may include multiple power busses disposed within a section 14. In the illustrated embodiment, the bus system 28 includes first, second and third vertical bus conductors 30 disposed proximal to one another, which may correspond to differing phases of a three-phase power system (power conductors). Further, the bus system 28 includes first, second and third horizontal bus conductors 40 disposed proximal to one another, which may also correspond to the differing phases of the three-phase power system (power conductors), but in a different direction.

Figure 5:
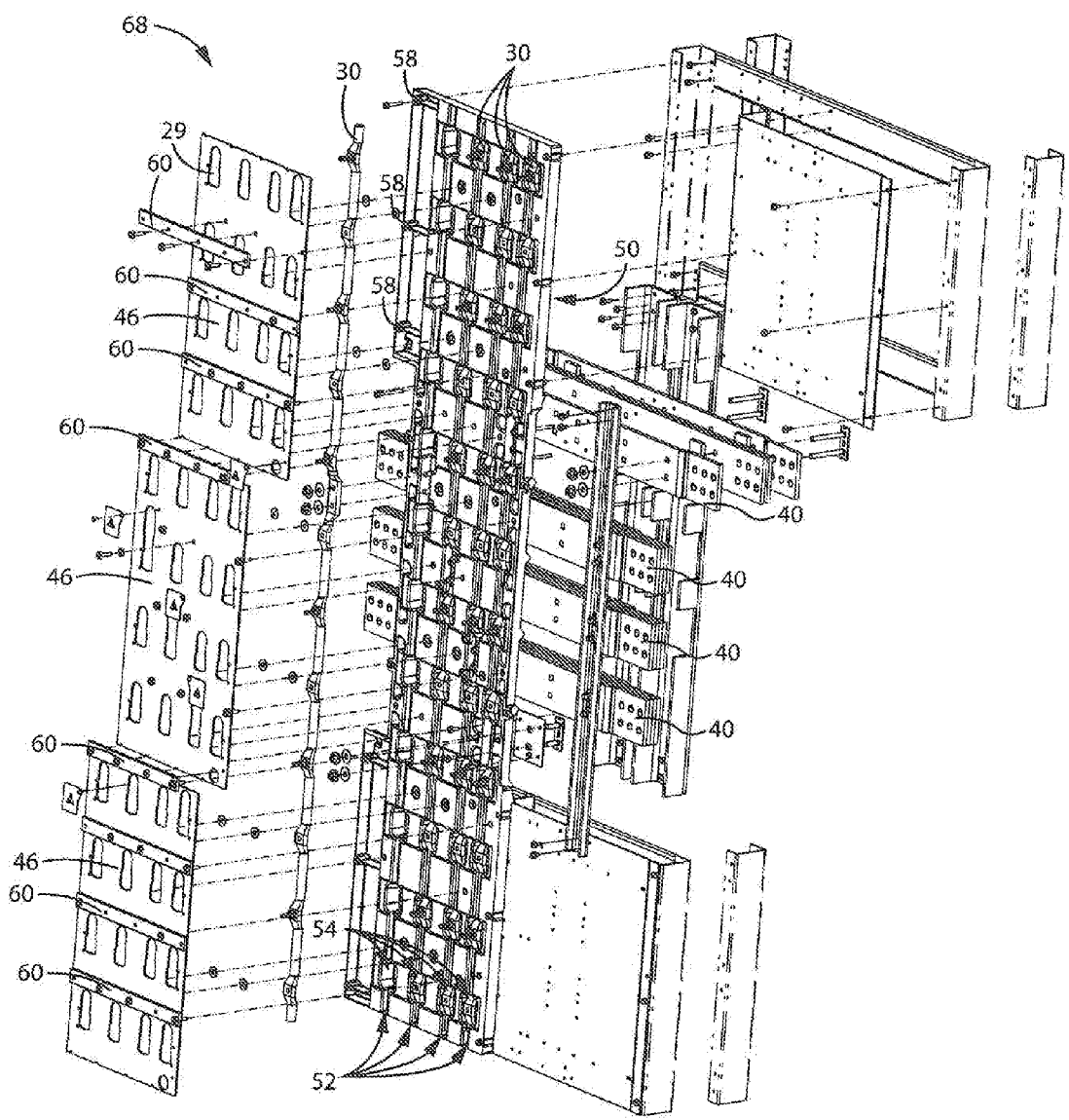
FIG. 5 is an exemplary exploded view of a 4-pole bus system with an electrically insulating bus support which may be used in the electrical system of FIGS. 1-3.

In certain embodiments, the horizontal bus conductors 40 could be coupled to cabling that supplies three-phase power from an external power supply, such as a power supply grid, and the first, second and third horizontal bus conductors 40 could be coupled to the first, second and third vertical bus conductors 30, respectively. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as the 4-pole bus system 68 of FIG. 5, for example providing a neutral conductor, a protective earth, ground or additional power phase. In other arrangements, even more horizontal and/or vertical bus conductors could be provided, or fewer could be provided, as may be appropriate for the environment.

The bus system 28 may include one or more bus covers 46 and a rear bus support 50 that will be described in greater detail below. In the illustrated embodiment, the bus covers 46 may comprise a molded sheet of synthetic material disposed over the vertical and horizontal bus conductors and may serve to prevent contact with underlying power busses except through the openings 29 (and corresponding slots 26) where provided. The vertical bus conductors 30 are typically made of a bar stock or tubing stock with a flat area that permits them to be mechanically and electrically coupled to corresponding horizontal bus conductors 40 in the bus system 28 as will be described below with respect to FIGS. 7-11.

Connection of component supports (such as mounted on plates or drawers, not shown) may be made by fixed feed units which receive fasteners from the vertical bus conductors 30. In alternative aspects, connections may also be made in certain spots by two pronged stabs (withdrawable units) that are received through the slots 26 where provided and engage the individual bus bars behind the bus covers 46 (see FIGS. 10 and 11).

The bus system 28 further includes an electrically insulating bus support 50 configured to support the vertical and horizontal bus conductors 30 and 40, respectively. The bus support 50 may be a preconfigured isolated bus support for supporting the power busses of the bus system 28. As illustrated, the bus support 50 may be a molding with vertical channels 52 to receive the vertical bus conductors 30 of FIG. 2. Each of the vertical channels 52 may include pockets 54 (which form rear protrusions on a rear side of the bus support 50). In the illustrated embodiment, the bus support 50 mechanically supports the various horizontal and vertical bus conductors. Within the bus system 28, and generally between the bus support 50 and the bus covers 46, each vertical bus conductor 30 may generally include a connection area that is engaged by either fasteners (for fixed feed units) or stabs (for withdrawable units) of component supports and a bus anchoring area. The bus support 50 may be electrically insulating to electrically isolate the vertical bus conductors 30 from the horizontal bus conductors 40.

Accordingly, the horizontal bus conductors 40 may be generally supported on a rear surface of the bus support 50, while the vertical bus conductors 40 may be supported on a front surface thereof. In the illustrated embodiment, the bus support 50 includes a series of apertures 58 or holes for receiving mounting bolts or screws. These apertures 58 will generally be aligned with corresponding apertures in a rear of the electrical system 10 to support the bus system 24 when mounted therein. The vertical bus conductors 30 may be received within corresponding recesses of the vertical channels 52. The recesses may generally be semicircular grooves in which the vertical bus conductors 30 may lie.

Opposing the aforementioned rear protrusions on the rear side of the bus support 50, which may be somewhat deeper than the recesses, are the pockets 54 which may house fasteners for connecting directly to fixed feed units. Alternatively, the pockets 54 may receive and accommodate stabs (not shown) of component supports, when provided, that may protrude through the slots 26 in the bus cover 46.

In the illustrated embodiment, the bus support 50 may be formed as a single piece of molded plastic material. The material is preferably one that will not degrade or melt with elevated temperatures that may occur during normal operation. In certain embodiments, the bus support 50 may comprise glass filled polyester, a thermoset plastic.

The bus support 50 may also include add-on bus support braces 60 disposed transverse with respect to the vertical channels 52. The bus support braces 60 may be configured to limit movement of the vertical bus conductors 30 during a high current event (such as a short-circuit). In addition, or alternatively, the bus support 50 could include add-on bus support braces (not shown) disposed on the rear side of the bus support 50 which may be configured to contact a rear side of the vertical channels 52, also to limit movement of the vertical bus conductors 30 during a high current event.

Referring now to FIG. 6, a plan view of an exemplar vertical bus conductor 30 configuration is provided in accordance with an embodiment of the invention. The vertical bus conductor 30 may have multiple substantially flat areas 70 between substantially curved areas 72, which may generally be circular, vertical bus round segments. As may best be seen in the detailed view of FIG. 7A, the substantially flat areas 70 may each have an aperture 74 or opening configured to receive a fastener. The substantially flat areas 70, and the apertures 74, may align with the pockets 54 of the vertical channels 52 of the bus support 50 (such as for the bus system 28 or the bus system 68) for accommodating connections to fixed feed units (see FIGS. 12 and 13). The vertical bus conductors 30 could be, for example, copper bus bars having multiple substantially flat areas 70, such as twelve substantially flat areas 70 illustrated in FIG. 6, for accommodating an equivalent number of fixed feed units in a section. The vertical bus conductors 30 may be formed by a substantially curved or round vertical bus bar, which may be solid or hollow copper tubing seamlessly provided, based on electrical current ratings of a system, and which is selectively flattened in predetermined areas to accommodate fixed feeds for units in a section.

Figure 15:
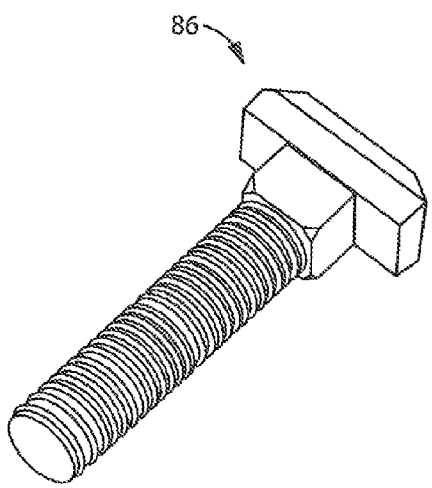
FIG. 15 is an isometric view of an exemplar fastener in accordance with an embodiment of the invention.

In one aspect, the apertures 74 may be rectangular in shape. Such shape may advantageously allow a correspondingly shaped fastener to be securely positioned for subsequent fastening to a fixed feed unit. An exemplar corresponding fastener may be a square shank carriage T-bolt or similar screw (see FIG. 15). It will be appreciated that other shapes may be provided to achieve a similarly function within the scope of the invention.

Figure 9:
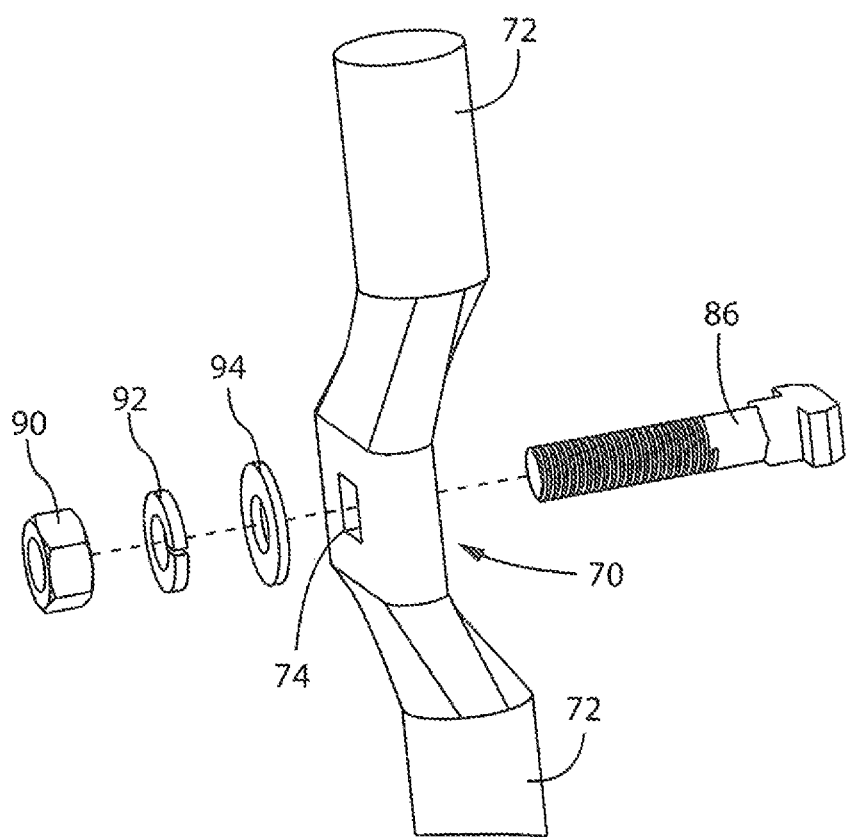
FIG. 9 is a detailed exploded view of a vertical bus conductor receiving a fastener in accordance with an embodiment of the invention.

Referring briefly to FIG. 9, for attaching to a fixed feed unit, a fastener 86 may pass through an aperture 74 (perhaps securing the fastener 86 to the shape of the aperture 74) of a substantially flat area 70 and, in turn, an opening 29 of a bus cover 46. On an opposing side of the substantially flat area 70, a nut 90, spring washer 92, washer 94, and/or the like may be used to retain the fastener 86.

As may best be seen in the isometric view of FIG. 7B, the substantially curved areas 72 may be provided in a first plane 80, and the substantially flat areas 70 may be provided in a second plane 82 parallel to the first plane 80. Accordingly, the substantially flat areas 70 may provide an accommodation space 84, between a substantially flat area 70 and a pocket 54, for a fastener 86 (see FIGS. 12 and 13). The accommodation space 84 may provide a volume allowing room for a variety of fasteners, in the case of fixed feed units, and/or stabs or contacts, in the case of withdrawable units.

As may best be seen in the detailed view of FIG. 8A, vertical bus conductor 30 may also include an additional, larger substantially flat area, or horizontal bus conductor attachment area 76, for attachment to a horizontal bus conductor 40. The horizontal bus conductor attachment area 76 may be provided between substantially curved areas 72 and substantially flat areas 70. The horizontal bus conductor attachment area 76 may also include two (or more, depending on an electrical current rating) apertures 78 or openings configured to receive fasteners for attaching to a horizontal bus conductor 40. Accordingly, each horizontal bus conductor 40 may be attached to a different vertical bus conductor 30 (see FIGS. 4 and 5). The horizontal bus conductor attachment area 76 may also be flattened in a predetermined area for connection, similar to the substantially flat areas 70 for attachment to fixed feed units.

As the horizontal bus conductors 40 may typically be provided on a rear surface of the bus support 50, the horizontal bus conductor attachment area 76 may be provided in a third plane 88, different from the first and second planes 80 and 82, respectively. As may best be seen in the isometric view of FIG. 8B, the horizontal bus conductor attachment area 76 may be provided in the third plane 88 parallel to the first and second planes 80 and 82, respectively. Moreover, the first plane 80 (curved area) may be between the second and plane 82 (flat area for feed units) and the third plane 88 (flat area for horizontal bus conductor), respectively.

Referring now to FIGS. 10 and 11, isometric views of exemplar alternative first and second vertical bus conductors 100 and 110, respectively, are provided in accordance with embodiments of the invention. The first and second vertical bus conductors 100 and 110, respectively, could each be provided, for example, in a section or column which might accommodate twelve electrical units (labeled "A" through "L" as illustrated), which may be fixed feed or withdrawable units, received in s compartment.

In the first vertical bus conductor 100, adjacent electrical units at an upper end, A and B, may be fixed feed units connecting directly to substantially flat areas 70 with apertures 74 via fasteners 86. However, subsequent electrical units C, D and E may be withdrawable units connecting to substantially curved areas 72 via stabs or contacts. A next electrical unit F may be a fixed feed unit, followed by a horizontal bus conductor attachment area 76, and then another electrical unit G which may also be a fixed feed unit. Subsequent electrical units H, I and J may be withdrawable units, again connecting to substantially curved areas 72 via stabs or contacts, and ending electrical units K and L may be fixed feed units, again connecting directly to substantially flat areas 70 with apertures 74 between via fasteners 86. Each of the electrical units A-L, whether fixed feed units or withdrawable units, may align with pockets 54, which pockets may be evenly spaced or symmetrically distributed along the bus support 50.

In another aspect, the second vertical bus conductor 110 could provide, for example, for all fixed feed units in an upper half, and all withdrawable units in a lower half. It will be appreciated that significant flexibility may be realized with varying vertical bus conductor configurations, including with horizontal bus conductor attachment areas 76 at differing locations, all of which are deemed within the scope of the invention.

Figure 12:
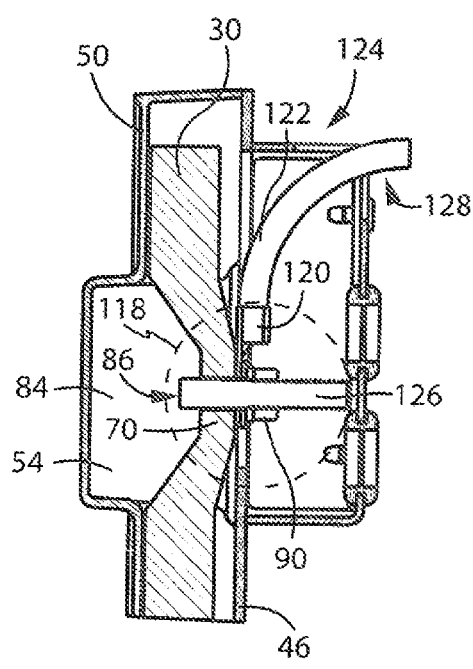
FIG. 12 is a side view of a substantially flat area receiving a straight crimp lug and being covered by an electrically insulating cover in accordance with an embodiment of the invention.
Figure 13:
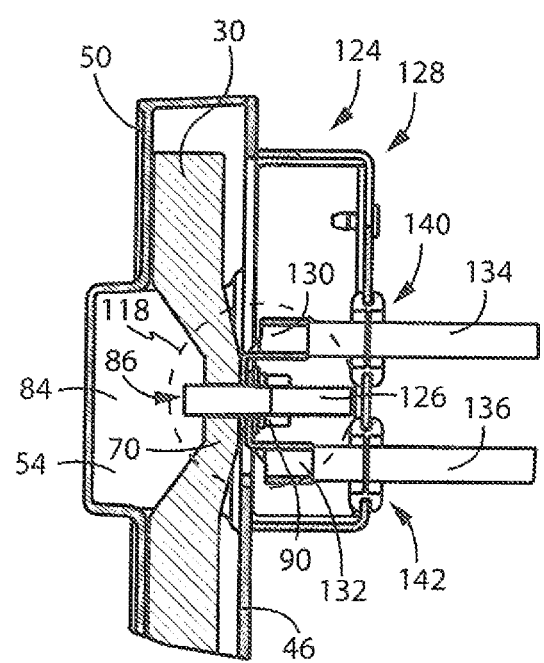
FIG. 13 is a side view of a substantially flat area receiving multiple bent crimp lugs and being covered by an electrically insulating cover in accordance with an embodiment of the invention.
Figure 14:
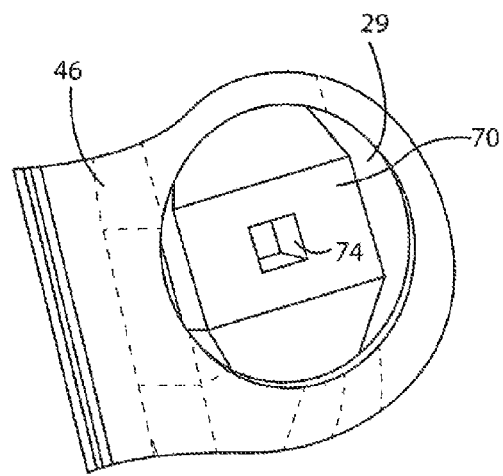
FIG. 14 is an isometric view of a substantially flat area of a vertical bus conductor exposed through an opening of a bus cover in accordance with an embodiment of the invention.

Referring now to FIGS. 12 and 13, side views of substantially flat areas 70 receiving crimp lugs in connection areas 118 for making electrical connections to fixed feed units, and including electrically insulating covers for providing electrical isolation, are provided in accordance with embodiments of the invention. In FIG. 12, a substantially flat area 70 of the vertical bus conductor 30 may be exposed through openings 29 of the bus cover 46 (see FIG. 14). The fastener 86 may pass through the vertical bus conductor 30, at the aperture 74, through the opening 29, and through a straight crimp lug 120 provided on an opposing side of the vertical bus conductor 30. A nut 90 may be provided over the straight crimp lug 120 to secure the straight crimp lug to the vertical bus conductor 30 to form the connection area 118. A wire 122, which may be crimped to the straight crimp lug 120, may lead to a fixed feed unit or other hardware in the system as desired.

An electrically insulating cover 124 may be provided over the straight crimp lug 120, the nut 90, and an end 126 of the fastener 86. The electrically insulating cover 124 could be formed from plastic or another electrically insulating material. Accordingly, the electrically insulating cover 124 may cover a rear side of the connection area 118 to provide separation between the vertical bus compartment and the functional unit space (electrical isolation), such as in accordance with IEC 60529 IP2X, IP4X and/or similar standards. The electrically insulating cover 124 may include an upper aperture 128, or upper opening, allowing an egress path for the wire 122, (following a natural curve of the wire 122) from the connection area 118 to the system. The upper aperture 128 may ensure that the connection area 118 is substantially covered and electrically isolated while still making an electrical connection via an insulating wire.

In the alternative aspect of FIG. 13, the fastener 86 passes through the vertical bus conductor 30, at the aperture 74, then through first and second bent crimp lugs 130 and 132, respectively, provided on an opposing side of the vertical bus conductor 30. A nut 90 may be provided over the first and second bent crimp lugs 130 and 132, respectively, to secure the bent crimp lugs to the vertical bus conductor 30 to form the connection area 118. First and second wires 134 and 136, respectively, crimped to the first and second bent crimp lugs 130 and 132, respectively, may lead to a fixed feed unit or other hardware in the system as desired.

The electrically insulating cover 124 may also be provided over the first and second bent crimp lugs 130 and 132, respectively, the nut 90, and end 126 of the fastener 86 to provide the electrical isolation. However, the upper aperture 128 may be plugged or closed via an electrically insulating cap, and first and second mid apertures 140 and 142, respectively, may be provided instead for allowing egress paths for the first and second wires 134 and 136, respectively from the connection area 118 to the system. The first and second mid apertures 140 and 142, respectively, may ensure that the connection area 118 is substantially covered and electrically isolated while still making electrical connections via insulating wires (the first and second mid apertures 140 and 142, respectively, could also be plugged or closed via an electrically insulating cap when not in use, such as in the embodiment of FIG. 12).

Figure 16:
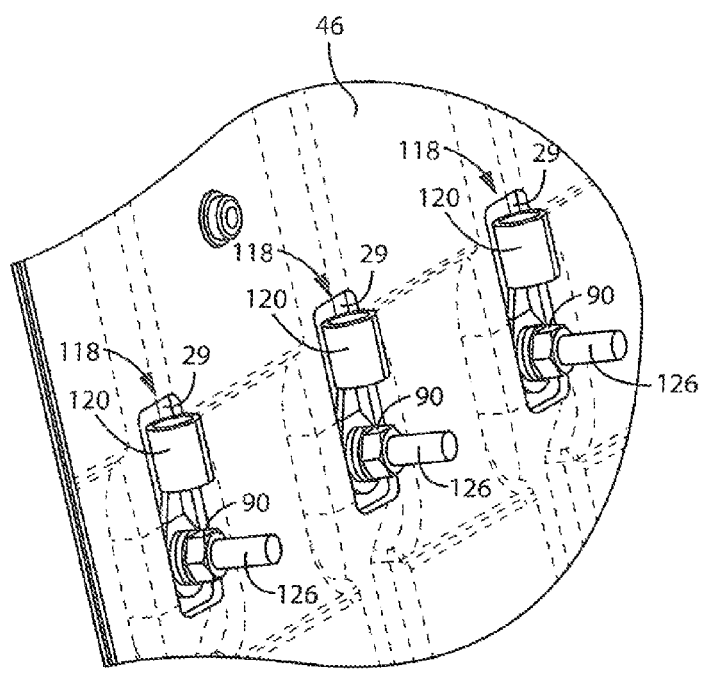
FIG. 16 is an isometric view of substantially flat areas connected to straight crimp tugs for providing electrical connections to fixed feed electrical units in a compartment of an electrical system in accordance with an embodiment of the invention.
Figure 17:
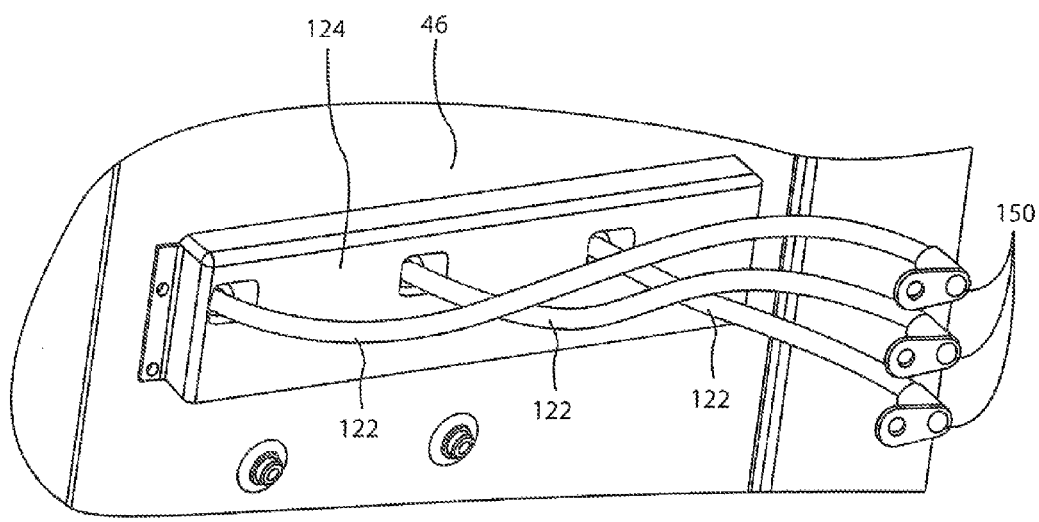
FIG. 17 is an isometric view of an electrically insulating cover mounted to a bus cover with wires egressing from the electrically insulating cover in accordance with an embodiment of the invention.
Figure 18:
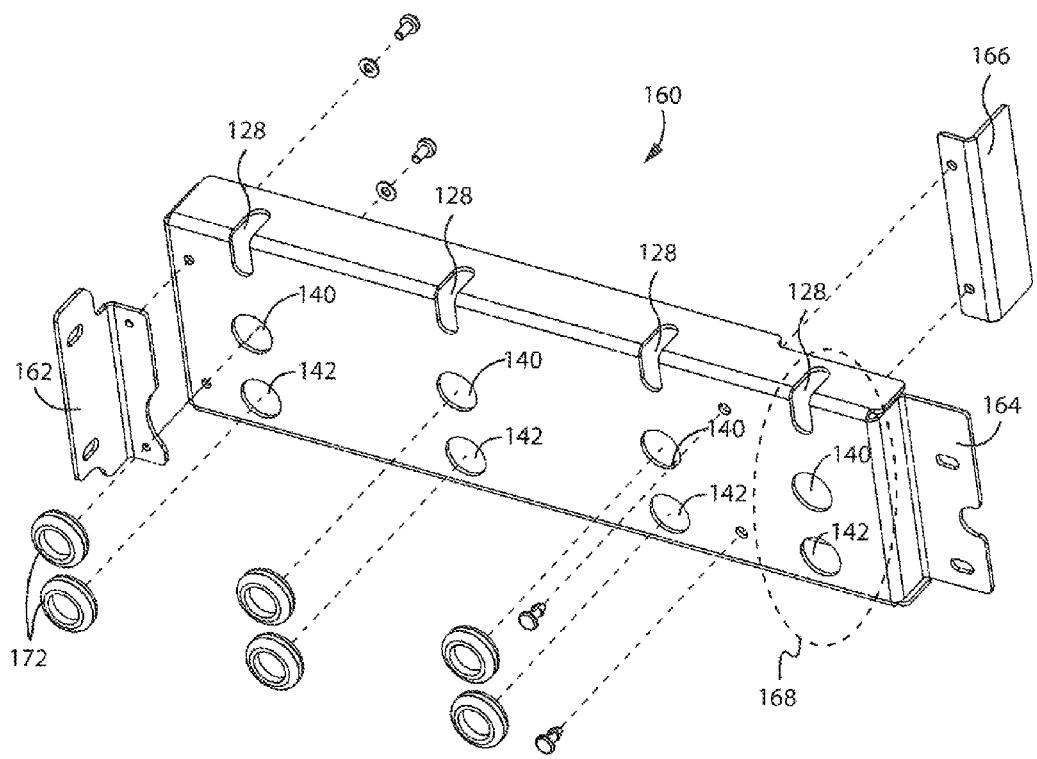
FIG. 18 is an isometric view of a first electrically insulating cover which may be used for a 3-pole or a 4-pole bus system in accordance with an embodiment of the invention.
Figure 19:
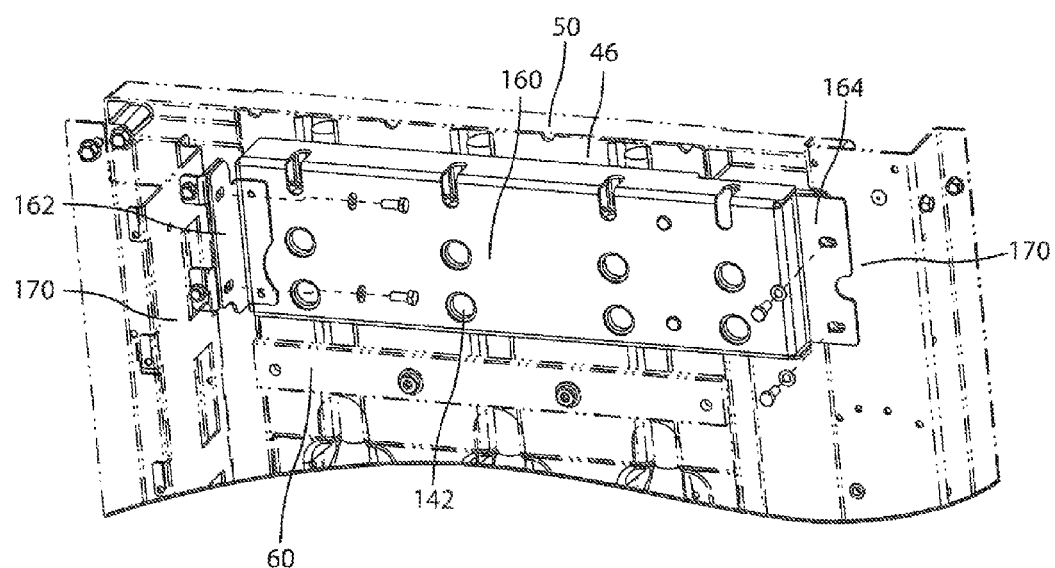
FIG. 19 is an isometric view of the electrically insulating cover of FIG. 18 mounted to an electrically insulating bus support in accordance with an embodiment of the invention.

Referring now to FIG. 16, an isometric view of three connection areas 118 (such as for a 3-pole configuration), including substantially flat areas 70 connected to straight crimp lugs 120 for providing electrical connections to a fixed feed electrical unit, is provided in accordance with an embodiment of the invention. Referring also to FIG. 17, the electrically insulating cover 124 may be mounted to the bus cover 46 to cover the connection areas 118. The wires 122 may egress from the electrically insulating cover 124 to provide connections in the system (such as via fixed feed unit retaining lugs 150), in accordance with an embodiment of the invention. Accordingly, the electrically insulating cover 124 may be positioned over a substantially flat area of each of the vertical bus conductors Referring now to FIG. 18, an isometric view of a first electrically insulating cover 160, and associated components, which may be used in a 3-pole or a 4-pole bus system is provided in accordance with an embodiment of the invention. A mounting bracket 162 and a mounting flange 164 of the first electrically insulating cover 160 may be used to mount the first electrically insulating cover 160 to the bus system (such as, to the bus support 50 and/or support structure 170) (see FIG. 19). In one arrangement, such as when used in a 3-pole configuration, an electrical separation plate 166 may also be mounted beneath the electrically insulating cover 160 to electrically isolate egress openings 168 that are not being used. In another arrangement, such as when used in a 4-pole configuration, the separation plate 166 may be removed, and one or more of the egress openings 168 may be used. Grommets 172 may also be provided at egress openings where necessary (such as the first or second mid apertures 140 and 142, respectively) to provide improved electrical isolation and/or strain relief for wires.

Figure 20:
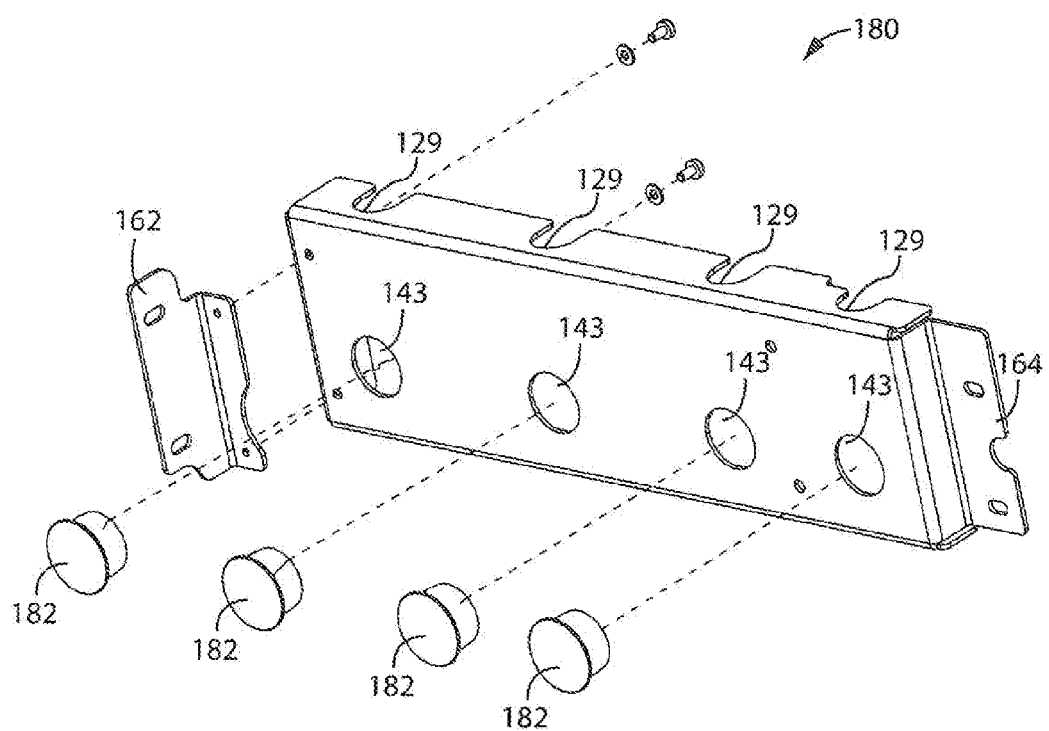
FIG. 20 is an isometric view of a second electrically insulating cover which may be used in a 3-pole or a 4-pole bus system in accordance with an embodiment of the invention.

Referring now to FIG. 20, an isometric view of a second electrically insulating cover 180, and associated components, which could be used in a 4-pole bus system, for example, is provided in accordance with an embodiment of the invention. The second electrically insulating cover 180 has a lower profile than the first electrically insulating cover 160, with only single mid apertures 143 (for bent crimp lugs) and smaller upper apertures 129 (for straight crimp lugs). Also, instead of grommets 172, electrically insulating caps 182 as illustrated, which could be plastic caps, for example, may be provided to plug or close the apertures for wire egresses when not in use.

Figure 21:
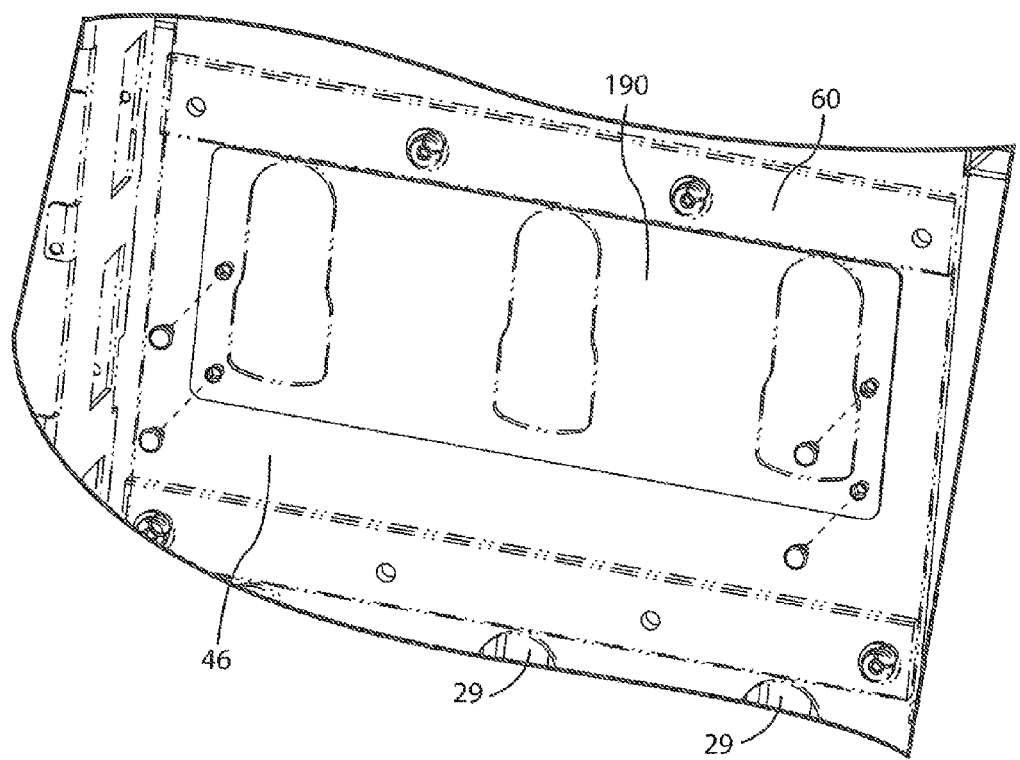
FIG. 21 is an isometric view of a plate mounted over a bus cover when corresponding electrical connections are not needed in accordance with an embodiment of the invention.

Referring now to FIG. 21, an isometric view of a cover 190 or wall mounted over the electrically insulating bus cover 46 when corresponding electrical connections are not used is provided in accordance with an embodiment of the invention. The cover 190 may cover openings 29 in the bus cover 46 to provide electrical separation between the vertical bus compartment and the functional unit space in accordance with IEC 60529 IP2X, IP4X and/or similar standards.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. A bus system comprising:
    a plurality of vertical bus conductors, each vertical bus conductor having a plurality of substantially flat areas between substantially curved areas, the substantially flat areas each having an aperture configured to receive a fastener; and
    an electrically insulating bus support having a plurality of vertical channels configured to receive the vertical bus conductors,
    wherein the substantially curved areas are provided in a first plane and the substantially flat areas are provided in a second plane parallel to the first plane, and
    wherein the vertical bus conductors each further include a substantially flat area provided in a third plane parallel to the first and second planes, wherein the first plane is between the second and third planes.

2. The bus system of claim 1, wherein the vertical channels include a plurality of pockets, and wherein the substantially flat areas align with the pockets.

3. The bus system of claim 1, wherein the vertical channels include first and second pluralities of pockets, and wherein the substantially flat areas align with the first plurality of pockets and a plurality of substantially curved areas align with the second plurality of pockets.

4. The bus system of claim 1, further comprising a plurality of bus support braces disposed transverse with respect to the vertical channels, wherein the bus support braces are operable to limit movement of the vertical bus conductors during a high current event.

5. The bus system of claim 1, further comprising an electrically insulating cover provided over at least one substantially flat area of the plurality of substantially flat areas.

6. The bus system of claim 1, further comprising a plurality of horizontal bus conductors, wherein the electrically insulating bus support electrically isolates the vertical bus conductors from the horizontal bus conductors, and wherein the horizontal bus conductors are attached to the vertical bus conductors in the substantially flat areas provided in the third plane.

7. The bus system of claim 1, wherein the vertical bus conductors are copper bus bars, and wherein each plurality of substantially flat areas includes at least six substantially flat areas.

8. The bus system of claim 1, wherein the aperture is rectangular.

9. An electrical system comprising:
    a plurality of compartments, each compartment being configured to receive a unit having an electrical component;
    a plurality of vertical bus conductors, each vertical bus conductor having a plurality of substantially flat areas between substantially curved areas, the substantially flat areas each having an aperture providing a fastener exposed in a compartment;
    a plurality of horizontal bus conductors; and
    an electrically insulating bus support having a plurality of vertical channels configured to receive the vertical bus conductors, wherein the electrically insulating bus support electrically isolates the vertical bus conductors from the horizontal bus conductors,
    wherein each horizontal bus conductor is attached to a different vertical bus conductor,
    wherein the substantially curved areas are provided in a first plane and the substantially flat areas are provided in a second plane parallel to the first plane, and
    wherein the vertical bus conductors each further include a substantially flat area provided in a third plane parallel to the first and second planes, wherein the first plane is between the second and third planes.

10. The electrical system of claim 9, wherein the vertical channels include a plurality of pockets, and wherein the substantially flat areas align with the pockets.

11. The electrical system of claim 9, wherein the vertical channels include first and second pluralities of pockets, and wherein the substantially flat areas align with the first plurality of pockets and a plurality of substantially curved areas align with the second plurality of pockets.

12. The electrical system of claim 9, further comprising a plurality of bus support braces disposed transverse with respect to the vertical channels, wherein the bus support braces are operable to limit movement of the vertical bus conductors during a high current event.

13. The electrical system of claim 9, further comprising an electrically insulating cover provided over at least one substantially flat area of the plurality of substantially flat areas.

14. The electrical system of claim 9, wherein the horizontal bus conductors are attached to the vertical bus conductors in the substantially flat areas provided in the third plane.

15. The bus system of claim 9, wherein the vertical bus conductors are copper bus bars, wherein each plurality of substantially flat areas includes at least six substantially flat areas, and wherein the aperture is rectangular.

16. The electrical system of claim 9, wherein the electrical system is a Motor Control Center (MCC).

* * * * *